United States Patent [19]

Ambalavanar et al.

[11] Patent Number: 5,579,452
[45] Date of Patent: Nov. 26, 1996

[54] METHOD OF MANAGING MEMORY ALLOCATION IN A PRINTING SYSTEM

[75] Inventors: Samuel D. Ambalavanar, Rochester; Ronnie E. Sanford, Webster; Orlando Diaz, Rochester; Kenneth D. Romano, Webster; Anthony M. Frumusa, Penfield, all of N.Y.

[73] Assignee: Xerox Corporation, Stamford, Conn.

[21] Appl. No.: 315,274

[22] Filed: Sep. 29, 1994

[51] Int. Cl.⁶ .................................................. G06F 15/00
[52] U.S. Cl. ........................................ 395/115; 395/114
[58] Field of Search ..................................... 395/115, 114, 395/117, 113, 116, 110

[56] References Cited

U.S. PATENT DOCUMENTS

| | | | |
|---|---|---|---|
| 3,597,071 | 7/1971 | Jones | 355/3 |
| 4,821,107 | 4/1989 | Naito et al. | 358/256 |
| 5,021,892 | 6/1991 | Kita et al. | 358/468 |
| 5,047,955 | 9/1991 | Shope et al. | 364/519 |
| 5,119,473 | 6/1992 | Ikenoue et al. | 395/114 |
| 5,129,050 | 7/1992 | Ikenoue et al. | 395/110 |
| 5,170,340 | 12/1992 | Prokop et al. | 364/143 |
| 5,175,633 | 12/1992 | Saito et al. | 358/406 |
| 5,212,566 | 5/1993 | U et al. | 358/444 |
| 5,220,645 | 6/1993 | Nakajima | 395/113 |
| 5,223,948 | 6/1993 | Sakurai et al. | 358/404 |
| 5,276,799 | 1/1994 | Rivshin | 395/162 |
| 5,301,262 | 4/1994 | Kashiwagi | 395/117 |
| 5,307,458 | 4/1994 | Freiburg et al. | 395/115 |
| 5,351,074 | 9/1994 | Kadowaki et al. | 395/115 |
| 5,355,441 | 10/1994 | Kawai et al. | 395/115 |
| 5,457,777 | 10/1995 | Park | 395/162 |

FOREIGN PATENT DOCUMENTS

| | | |
|---|---|---|
| 550158A1 | 7/1993 | European Pat. Off. . |
| 1531401 | 11/1978 | United Kingdom . |
| WO9106058 | 5/1991 | WIPO . |

*Primary Examiner*—Raymond J. Bayerl
*Assistant Examiner*—Steven P. Sax
*Attorney, Agent, or Firm*—Gary B. Cohen

[57] ABSTRACT

A method of managing memory allocation in a printing system including the steps of creating a plurality of blocks and designating each block with an identifier. In response to a request from a client, a first set of identifiers, corresponding with a first set of blocks, is placed into a database by a resource manager. The client then accesses the database and, by reference to the first set of identifiers, begins filling up the first set of blocks with image data. As each block is filled, the client transmits an interrupt signal to a controller. After a predesignated one of the first set of blocks has been filled, the controller causes the resource manager to place a second set of identifiers in the database so that the client can access the second set of identifiers as soon as it has completed filling the first set of blocks.

17 Claims, 17 Drawing Sheets

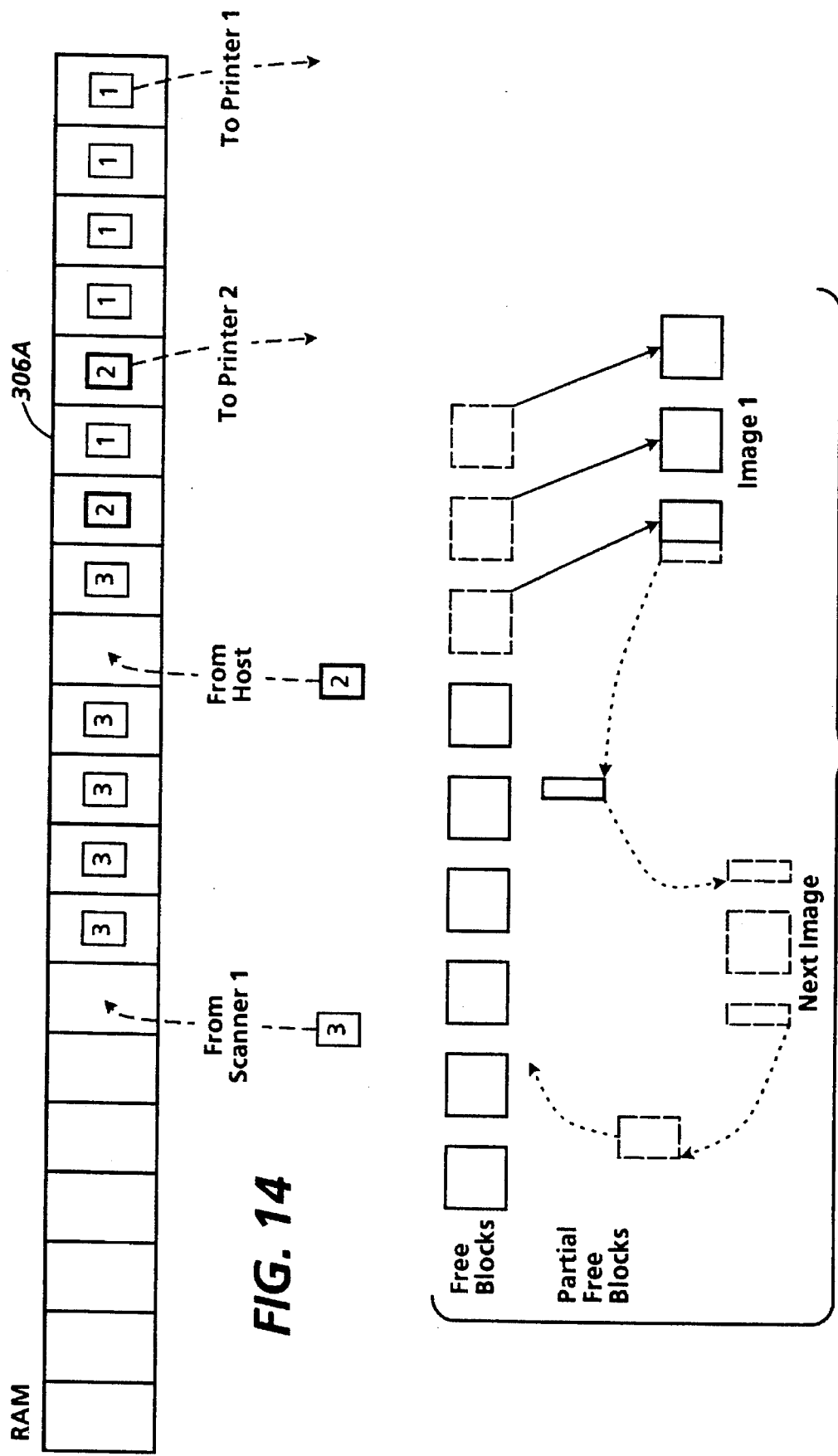

METHOD OF MANAGING MEMORY ALLOCATION IN A PRINTING SYSTEM

Cross reference is made to U.S. patent application Ser. No. 08/315,021 filed Sep. 29, 1994 entitled "Programmable Arbitrating Apparatus", filed, currently herewith, by Ambalavanar, the pertinent portions of which are incorporated herein by reference.

The present invention relates generally to a technique of memory management for a printing system and, more particularly, to a method of managing memory allocation for the printing system which minimizes both processing overhead and memory fragmentation.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307,458

Patentees: Freiburg et al.

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. No. 5,175,633 and U.S. Pat. No. 5,307,458, respectively, disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

U.S. Pat. No. 5,276,799 discloses a multi-bus printing system in which multiple tasks can be performed at any one moment in time. More particularly, a group of intelligent modules is in communication with a CBus, DBus and VBus, respectively, while a CPU processing module is in communication with the CBus and a DMA processing module is in communication with the DBus. One feature of this multi-bus printing system is that it provides a high level of concurrency. For example, in one embodiment three separate sets of data can be substantially concurrently transferred across the CBus, DBus and VBus.

Digital copiers typically seek to optimize concurrency and/or multi-tasking in operation. Xerox' DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al.

Publication Date of Complete Specification: Nov. 8, 1976

British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,301,262

Patentee: Kashiwagi

Issued: Apr. 5, 1994

The '262 patent, in contrast to the '401 British patent, compresses image data, prior to storing it in a page buffer, and decompresses the image data, prior to outputting it.

Since digital printing systems store images electronically, a significant amount of memory is often required for storage. In a multifunctional digital printing system, various clients, i.e. various input/output devices of the printing system, seek to use the memory. That is, input clients seek to access the memory for storing image data and output clients seek to access the memory for the sake of consuming image data. Without some sort of arrangement for controlling employment of the memory by these clients, operation of the system can be impaired greatly. For example, a client with relatively slow processing capability can monopolize use of the memory at the expense of a client with relatively fast processing capability. Moreover, the memory needs of a group of clients may vary, among individual clients, over time. In the area of computer architecture, it is known that memory or resource management is a desirable approach for insuring that allocation of memory among a group of clients is performed in an orderly manner. This notion of resource management has been extended to the area of printing by way of the following patent:

U.S. Pat. No. 5,212,566

Patentees: U et al.

Issued: May 18, 1993

U.S. Pat. No. 5,212,566 is directed toward a resource allocation scheme for a memory arrangement including disk and system memories, the system memory including a plurality of buffers. A system state controller communicates with the system memory, by way of a resource manager, and with a scanner, by way of a scan management arrangement, the scan management arrangement including a scan scheduler and a scan controller. In operation, the scanner, along with each client requesting use of the system memory, is allocated a set of buffers. During run time, the scanner fills buffers allocated to it with scanned data of a scan job, obtained by reading a document, and stores each filled buffer out to disk. If the scanner requires more buffers than are allocated to it, then a fault will occur. In response to the fault, a fault command flows from the scan controller to the system state controller, which system state controller, in turn, transmits a control command requesting the resource manager to adjust buffer allocation in the system memory. Under ideal circumstances, the scanner receives the buffers it needs to complete the scan job. As disclosed, reallocation includes obtaining a previously allocated buffer from a client other than the scanner.

While the resource management scheme of the '566 patent is well suited for its intended purpose, it appears to require a fair amount of processing overhead since buffer allocation among clients must often be assessed in obtaining a free buffer for the scanner. It would be desirable to provide a resource management scheme which uses a minimum amount of processing overhead in obtaining and providing memory for a given client. Additionally, in the resource management scheme of the '566, all of the buffers allocated to a given client may not be used fully. This can lead to underutilization of memory space and even memory fragmentation. It would be desirable to provide a resource management scheme in which all memory space of the system memory is employed in the most efficient manner possible.

The pertinent portions of all of the above-discussed references are incorporated herein by reference.

In accordance with one aspect of the disclosed embodiment of the present invention there is provided a method of managing memory allocation in a printing system with a controller and memory, the controller having a resource manager for managing use of the memory and the printing system supporting input clients, each input client seeking to store one or more images, in the form of image data, in the memory, comprising the steps of: partitioning at least a portion of the memory to create a plurality of blocks; providing each of the plurality of blocks with an identifier, each identifier indicating a location of a block in the memory; in response to a request from a selected input client, placing a first set of identifiers, corresponding with a first set of blocks, in a database; accessing the first set of identifiers with the selected input client; filling up one or more of the first set of blocks, with image data, by referring to the first set of identifiers; transmitting an interrupt signal to the controller, with the selected input client, each time one of the first set of blocks is filled; and in response to a designated one of the blocks being filled, placing a second set of identifiers, corresponding with a second set of blocks, in the database, so that when the selected input client has filled up a last one of the first set of blocks, the selected input client accesses the second set of blocks, by reference to the second set of identifiers and begins filling up a first block of the second set of blocks wherein memory allocation is accomplished with a minimum amount of communication between various components of the printing system.

In accordance with another aspect of the disclosed embodiment of the present invention there is provided a method of managing memory allocation in a printing system with an input client, the input client storing image data in memory for outputting an image associated with the image data, comprising the steps of: providing to the input client, a first set of blocks including a first block and a second block, wherein the second block includes a first part and a second part; filling up both the first block and the first part of the second block with image data, an end of the first part of the second block representing a corresponding end of a first image; and filling up the second part of the second block with image data, the image data in the second part of the second block corresponding with a second image, wherein the first image is different than the second image and usage of memory space for storing image data is maximized.

These and other aspects of the invention will become apparent from the following description, the description being used to illustrate a preferred embodiment of the invention when read in conjunction with the accompanying drawings.

FIG. 14 is a schematic representation of electronic precollation (EPC) memory being used in conjunction with the resource management scheme of the present invention;

FIG. 15 is a schematic representation illustrating how partial blocks are employed, in the resource management scheme, to reduce memory fragmentation;

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
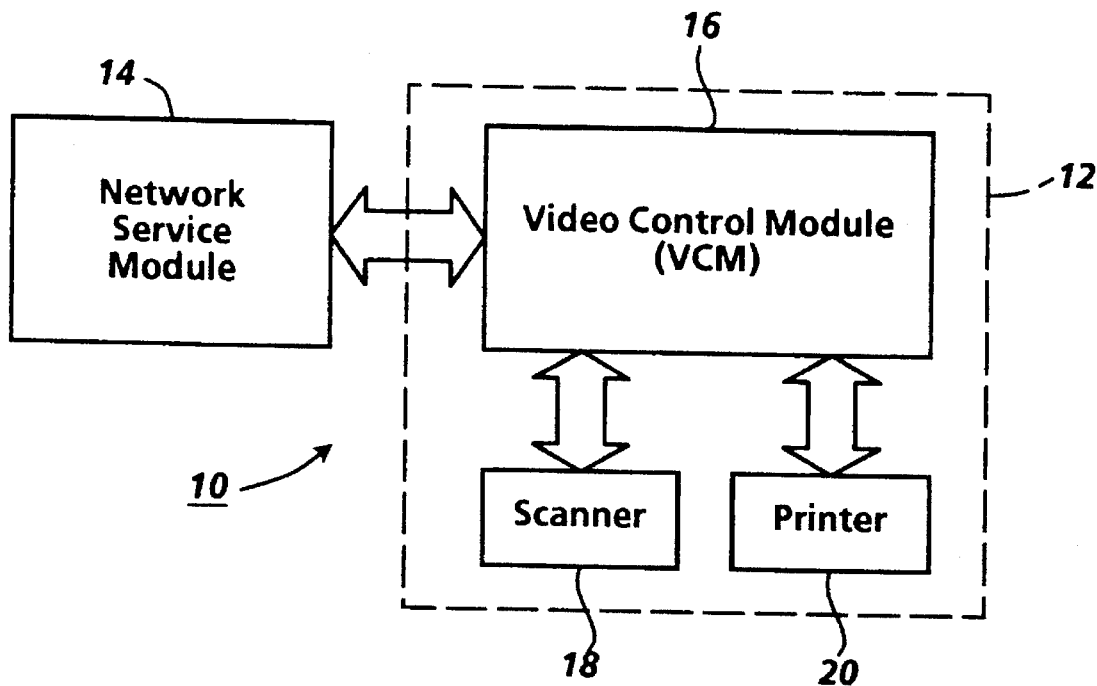
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)), preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
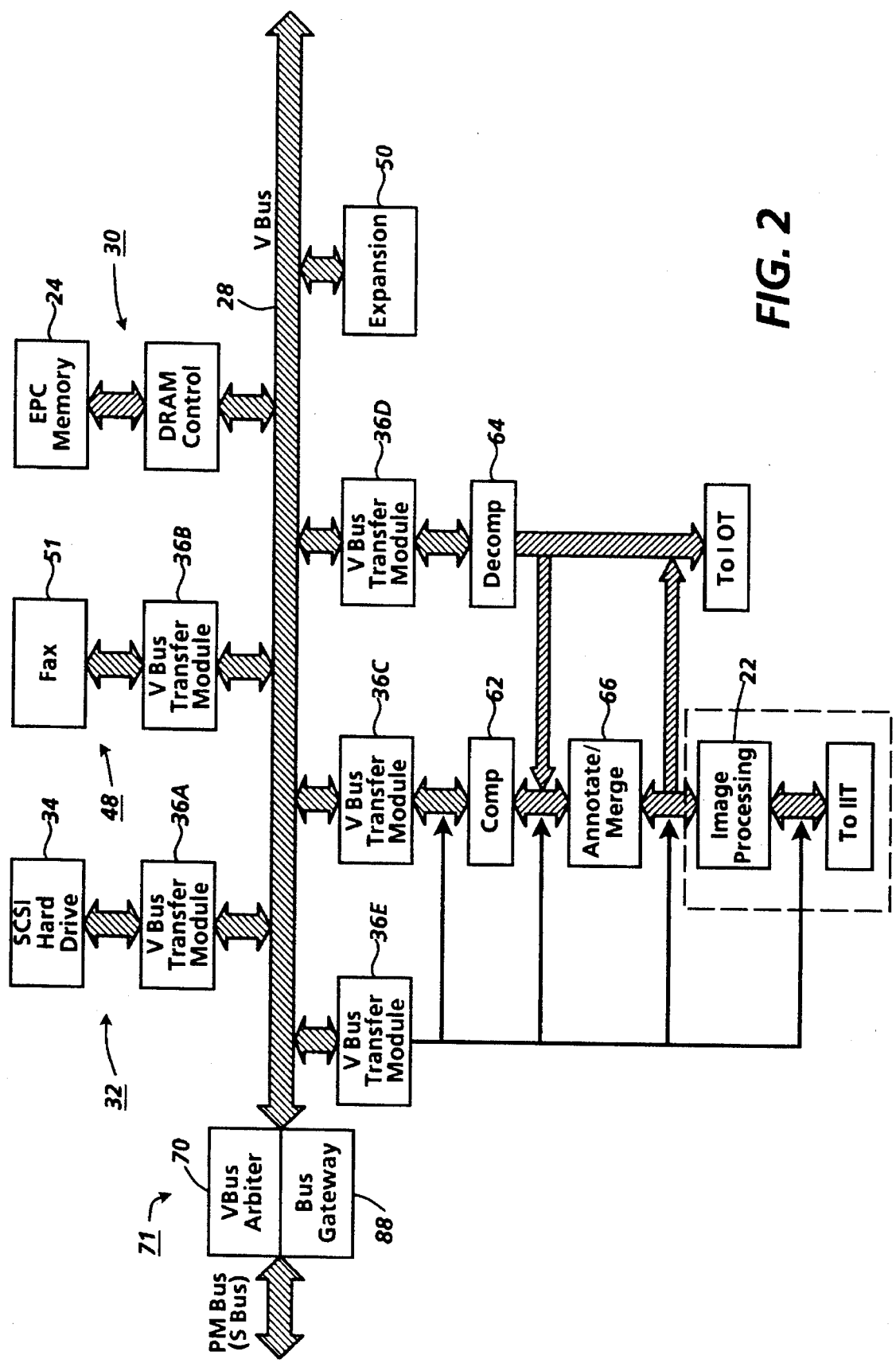
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
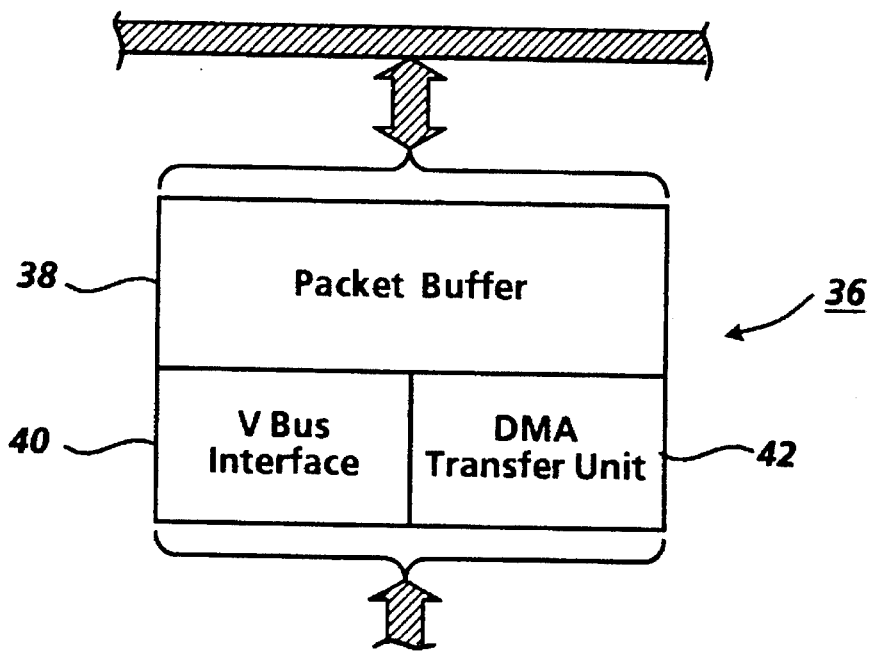
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 5:
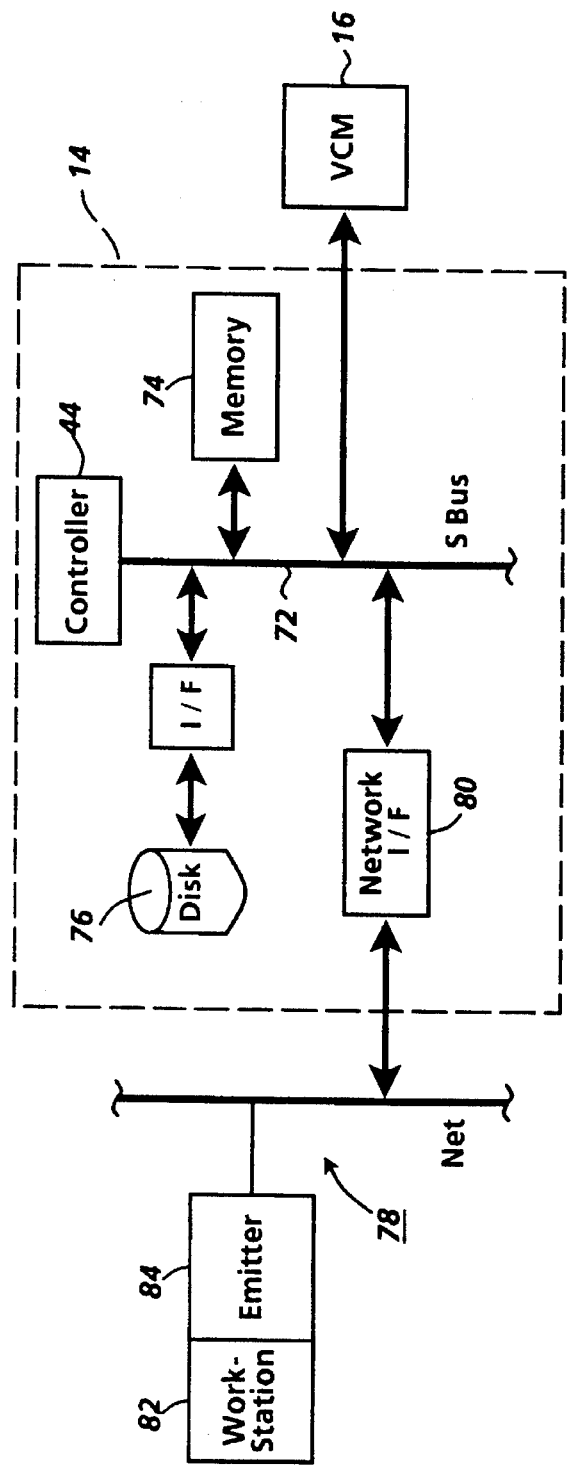
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, each imageThe DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
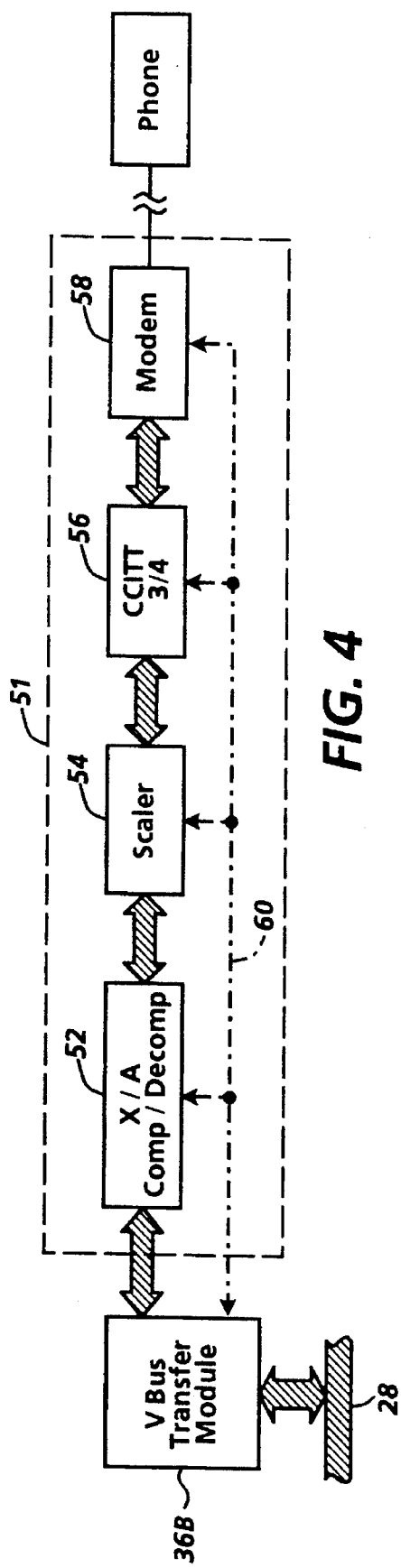
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Figure 19:
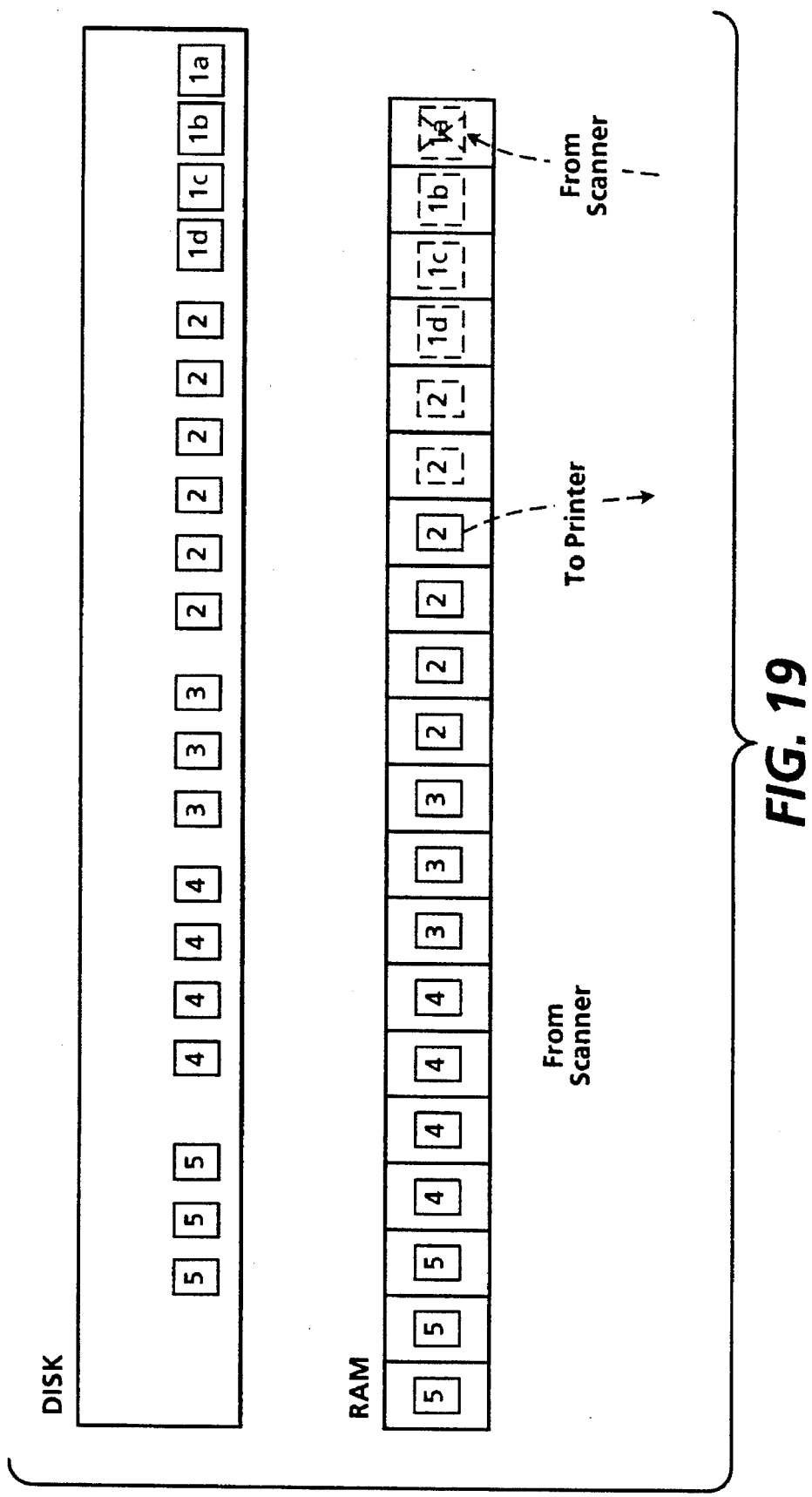

Referring to FIGS. 2, 3 and 5, further discussion regarding DMA transfer of each of the transfer modules 36 is provided. In particular, in one example, the images of a job are stored in the host memory 74 as a series of blocks. Referring to FIG. 19, a series of blocks is shown as being stored in the EPC memory 24. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Referring to FIGS. 2, and 5–7, one aspect of operation of the above described printing system is discussed. In particular, FIGS. 6 and 7 relate to an advantageous manner in which the transfer modules 36 are employed to facilitate a loopback approach for image processing of jobs which are captured at a location other than the scanner 18. In the illustrated embodiment of FIG. 6, a job is captured in the network service module 14 (step 90). This is not to imply, however, that the loopback operation could not be performed, with equal facility, on a job captured at another location, such as the FAX module 48. Upon capturing the network job, it is either spooled in, for example, the SCSI disk 76 for eventual decomposition (steps 92, 94) or decomposed with the controller 44 for storage in the host memory 74 (steps 92, 96). If the process branches to step 94, a return is encountered. Accordingly, functions are performed, relative to other jobs, until the system is ready to decompose the spooled job. When it is time to decompose the spooled job, processing of the spooled job will resume at step 96.

Assuming that the job is decomposed, and image processing is required by the job, one or more transfer modules 36 are programmed, via step 98, for transferring electronic pages of the job to one or more destinations. It should be appreciated that, in one example, it may be desirable to program transfer module 36e for transferring an electronic page to the image processing section 22 and to program transfer module 36c for transferring the resulting image processed electronic page to EPC memory 24. It will be appreciated that other ones of the transfer modules could be programmed in a manner that would enhance system concurrency. For example, in the case where the image processed electronic page is transferred to EPC memory, the transfer module 36a could be programmed to spool a copy of the image processed electronic page in the SCSI disk 34.

At step 100, it is determined whether a current electronic page requires image processing. Initially, this determination would be made for a first page of the job. Assuming that the current electronic page does not require image processing, it is determined, at step 102, whether the current electronic page is to be transferred to a location other than the host memory 74. In one example, it may be desired to transfer the electronic page to the EPC memory 24 for eventual output (at, for example, the printer 20 or the facsimile device 51) or storage (in the SCSI disk 34). If the current page is to be transferred, then step 104 is executed, otherwise, the process proceeds to step 106 (FIG. 7) so that further electronic pages can be, if necessary, image processed and/or transferred (step 107).

Assuming that the current electronic page is to be image processed (FIG. 6), the image processing section 22 is set up, via step 108, to perform one or more selected image processing operations on a selected electronic page. In response to setting up appropriate image processing control registers, at step 108, the current electronic page is transferred, with the transfer module 36e, to the image processing section 22 (step 110) and, at step 112, one or more programmed image processing operations are performed on the current electronic page. Upon completion of the image processing operations, it is determined, at step 114, whether the image processed electronic page should be transferred to storage (e.g. EPC memory 24 or host memory 74) or an output device (e.g. printer 20 or FAX module 48).

If the current electronic page is to be stored, then a decision is made, at step 118 (FIG. 7), as to whether the current electronic page is to be stored. For the most part, the printing system compresses the current electronic page, to promote efficient storage, unless a print of the current electronic page is to be produced. Indeed, even when printing a job, the corresponding electronic pages are often compressed and then stored in the EPC memory for "print readiness". With this approach a selected number of job copies can be printed without capturing/processing the job more than once. In some instances, however, it may be desirable to produce a single print from a current electronic job. For example, a single print may be produced for purposes of proofing. If compression is required, then the current electronic page is passed to the compressor 62, at step 120, otherwise, a storage destination of the current electronic page is determined directly, at step 122.

Figure 6:
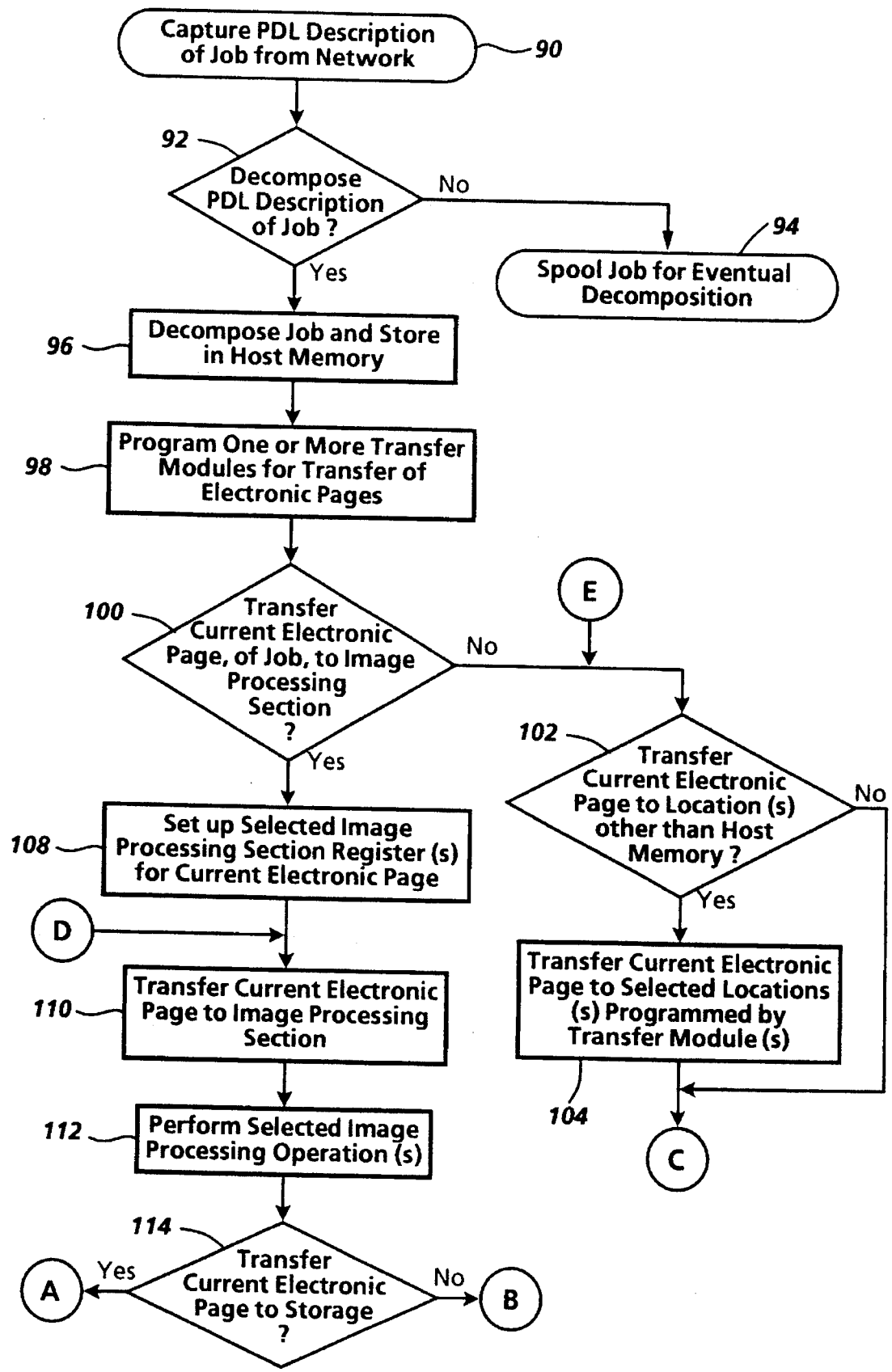
FIGS. 6 and 7 represent a flow diagram for a loopback image processing method of the present invention.
Figure 7:
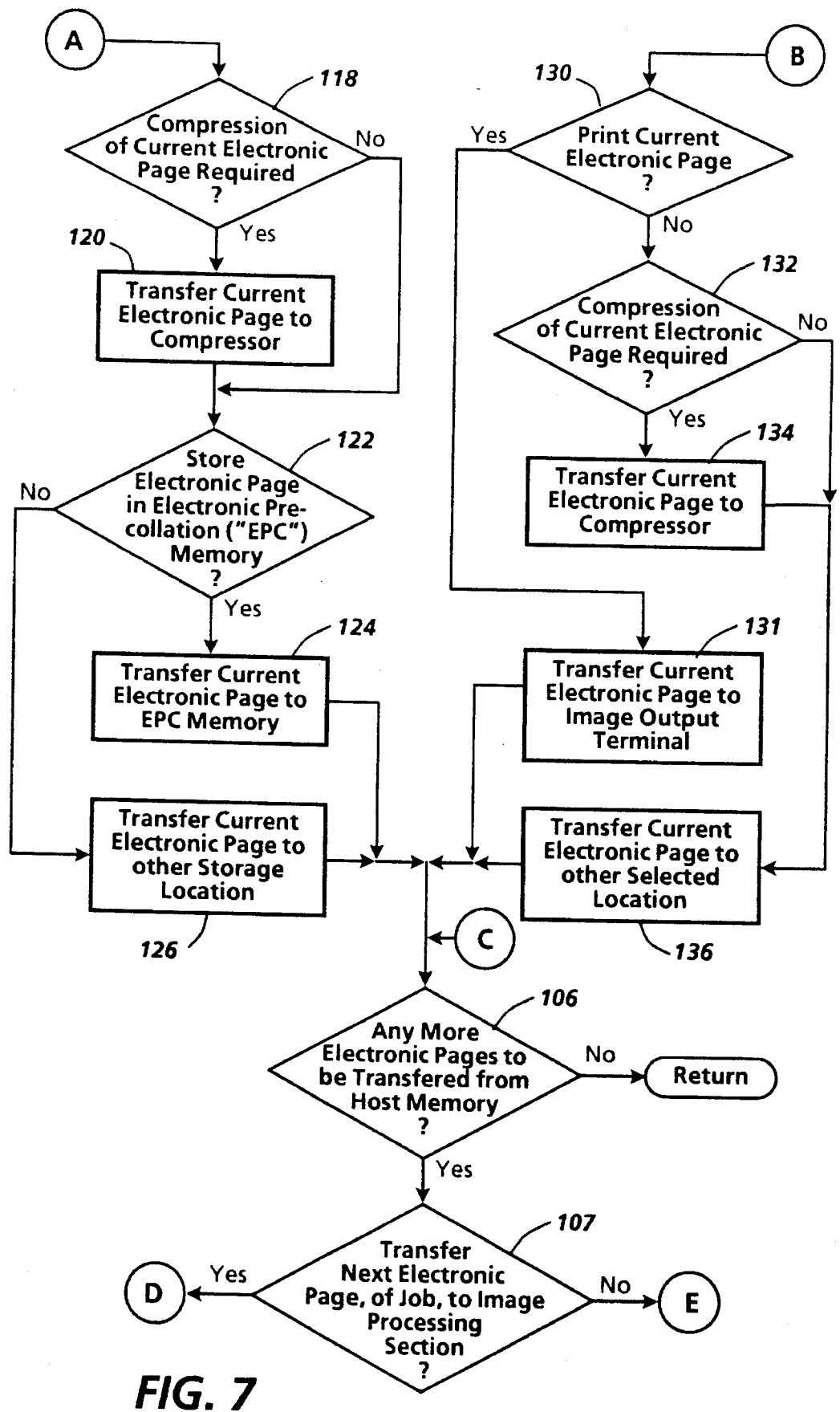

If the decision at step 122 is in the positive, then the process proceeds to step 124, where the current electronic page is transferred to the EPC memory, and then to step 106, where a check is made to determine if any more electronic pages exist, for the job, in the host memory 74. If the decision at step 122 is in the negative, then the current electronic page is transferred to a designated storage location other than the EPC memory (step 126), such as the host memory 74, and the process proceeds to step 106. Assuming that the current electronic page is not going to be stored, it is determined, at step 130, whether the current electronic page is to be printed. If the current electronic page is to be printed, then the same is transferred to the printer 20 for marking (step 131), otherwise, it is determined, at step 132, whether the current electronic page is to be compressed. As mentioned above, if an electronic page is not printed, then, typically, it is compressed. Assuming compression is required, the process proceeds to step 134, otherwise a transfer of the current electronic page to another location is performed directly at step 136. In either case, the process proceeds eventually to step 106. If all of the electronic pages in the host memory have been read, then the routine of FIGS. 6 and 7 is ended through a return. If, on the other hand, more pages need be transferred, then the process proceeds to step 107 where a next current electronic page is either processed or, if necessary, transferred away from host memory to another storage location or an output device.

Figure 8:
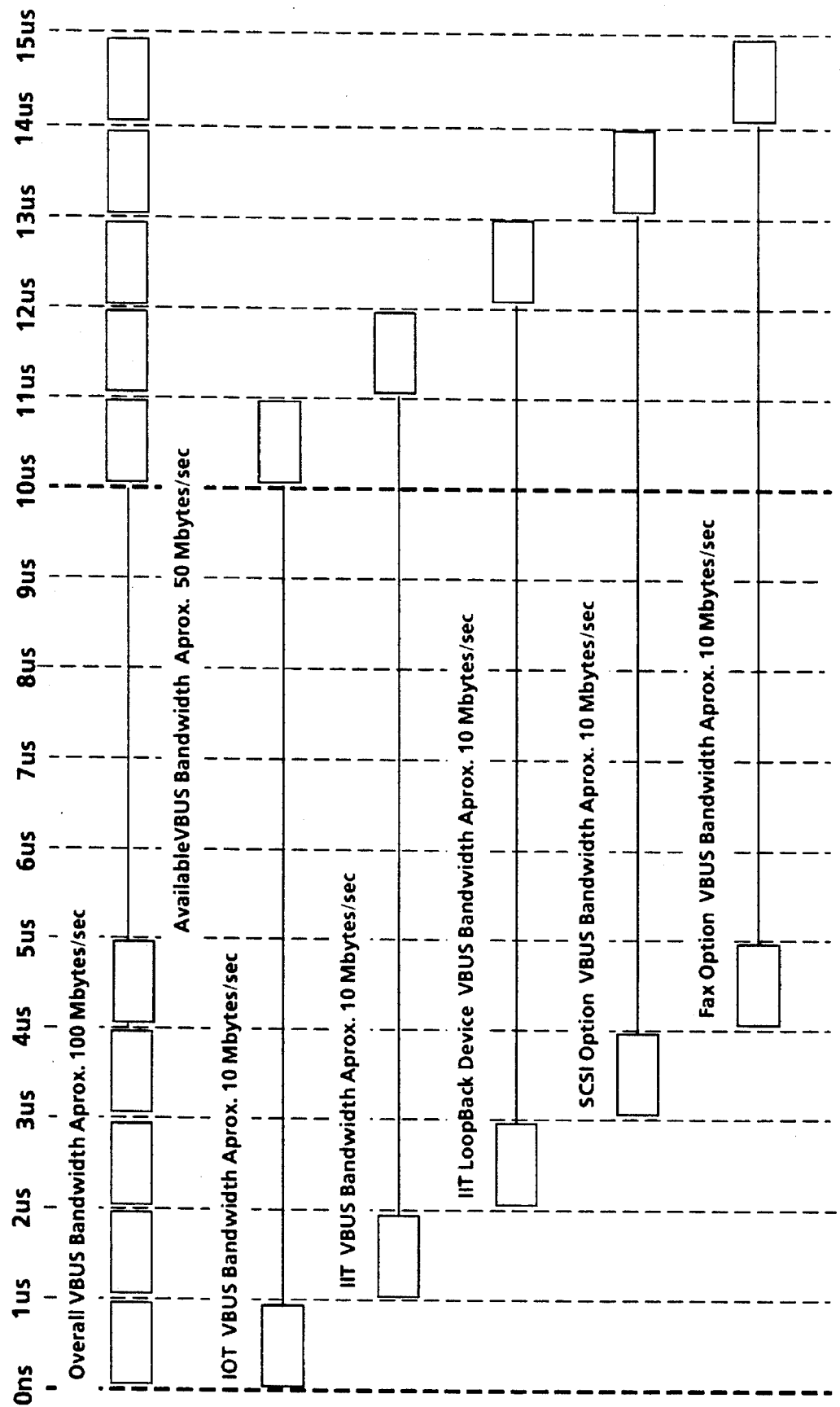
FIG. 8 is a timing diagram depicting a manner in which a plurality of bus masters can share a video bus, of the printing machine of FIG. 1, in a time-shared manner.

Referring to FIG. 8, another aspect of operation of the above described printing system is discussed. The illustrated timing diagram of FIG. 8 shows how each bus master on the Vbus 28 shares the available bandwidth by time multiplexing the high speed bus and sending a fragment of a job or image file every time the bus master has access to the bus. Each time one of the bus masters receives a grant of the bus, via the arbiter 70, the bus master sends a packet of information on the bus while it continues to receive data from its respective interface. Packet sizes are programmable in sizes ranging from 4 bytes to 64 bytes per packet. In the example of FIG. 8, each device requires approximately 10 Mbytes/sec of bandwidth from the Vbus. When bus masters, each having a bandwidth requirement of 10 Mbytes/sec, are concurrently using the bus, the total bandwidth used on the bus is 50 Mbytes/sec. This leaves approximately 50 Mbytes/sec available bandwidth left on the bus. The remaining bus bandwidth can be used by any other bus masters wishing to transfer data on the Vbus. The large amount of available bandwidth also eliminates any contention problems which can arise with an over-utilized bus.

Referring to both FIGS. 2 and 8, it will be appreciated that the above-described multiplexing permits at least two jobs to be processed within a relatively brief time interval. For all intents and purposes, it would appear to a printing system user that the jobs were being operated on simultaneously. More specifically, a first job could be stored in the EPC memory 24 and a second job could be stored in the host memory 74. As soon as an image data packet of the second job is buffered in the packet buffer of transfer module 36e, a packet of image data from the first job can be delivered to the printer 20, by use of transfer module 36d, concurrently with image data being delivered to the image processing section 22. As will be further appreciated, by reference to FIG. 8, copies of packets of the first job could be delivered to various other bus masters in a time-sharing or multiplexed fashion.

Figure 9:
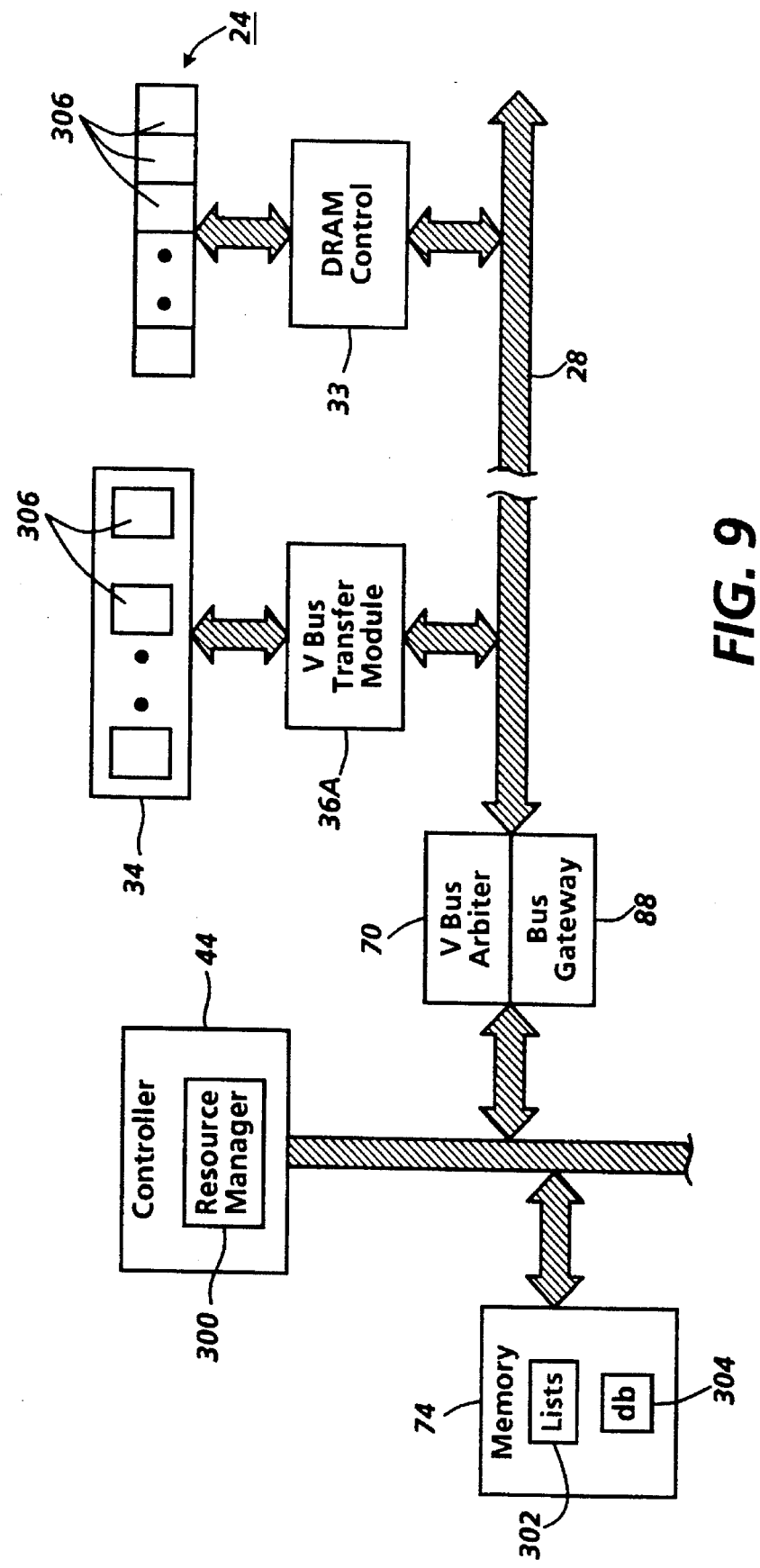
FIG. 9 is a block diagram of a resource management scheme including a selected number of components from the block diagram of FIG. 2.
Figure 10:
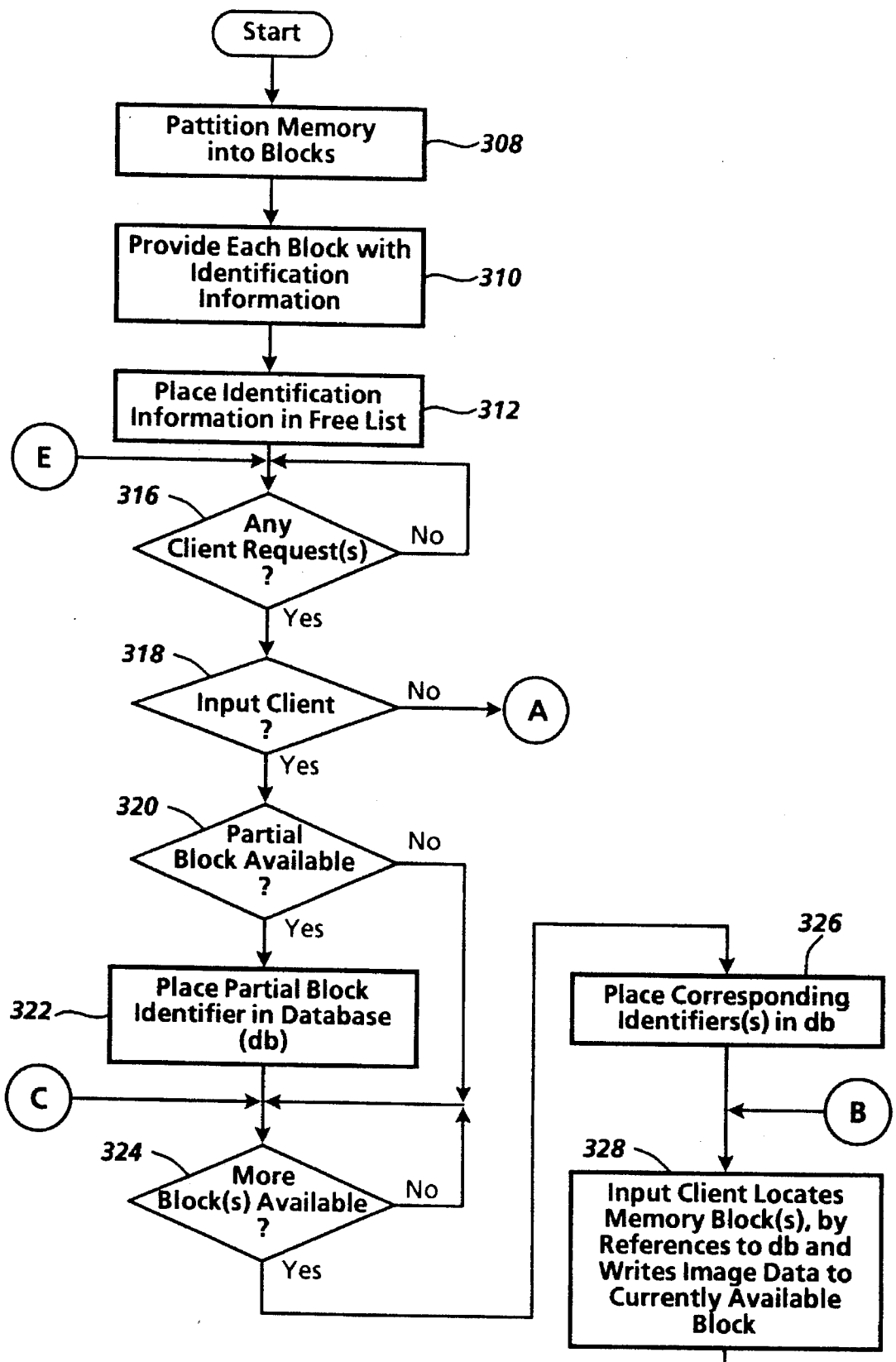
FIGS. 10–13 is a flow diagram illustrating some of the functionality of the resource management scheme of FIG. 9.

Referring to FIG. 9 a scheme for managing memory allocation, i.e. a resource management scheme, is illustrated. More particularly, the controller 44 includes a resource manager 300, while the host memory 74 includes a pair of lists 302, referred to respectively as the "free block list" and the "free partial block list", and a database ("db") 304. The resource manager is implemented by way of suitable algorithms, the details of which will be discussed in further detail below, and the significance of the lists and the database, relative to the resource management scheme, will also be discussed below. Additionally, the EPC memory 24 and the SCSI hard drive ("disk") 34 are shown as being comprised of blocks 306. A discussion of a methodology for forming and allocating memory blocks follows:

Referring to FIGS. 9–13, the algorithms for implementing the resource management scheme are discussed. Initially, at step 308, the EPC memory 24 is partitioned into a series of the blocks 306. A partitioned set of memory blocks is also shown in FIG. 14. Preferably, the block size is varied in accordance with factors, such as image size to be stored. For example, if a location generally copies complex documents which results in poorly compressed (large) image, the block size can be increased. As will appear from the discussion below, increased block size will result in fewer interrupts by a client (e.g. scanner 18) of the controller 44.

Each block is then provided with identification information (step 310), such as block ID, block address and block size, which identification information is placed, at step 312, in the free block list. Preferably, each list in the host memory 74 is a linked list of structures. At step 316, the resource management system waits for a memory request from a client. In the present context, a client is an input or output device encompassed by the printing system 10 (FIGS. 1,2 and 5). A client initiates a request by transmitting a suitable request or interrupt signal to the controller 44. Upon receiving a request signal, the controller determines, via step 316, whether the client is an input client. If the client is an input client, then the process proceeds to step 318, otherwise the process proceeds directly to step 320 (FIG. 12) where an output client request is serviced.

Assuming the requesting client is an input client, the resource manager 300 examines the free partial block list to determine if a partial block is available for the requesting client. Referring to FIG. 15, an example of the allocation of a partial block to the beginning of an image will be discussed. In particular, at system initialization, no partial block is available for an image 1 of a job. After image data for image 1 is delivered to the memory, however, a partial, unfilled block may remain. As shown in FIG. 15, and explained in further detail below, the partially unfilled block, with its corresponding identifier is made available for use with the next image.

Returning to FIG. 10, if a partial, untilled block is available, then it is designated with an identifier and, at step 322, placed in the db 304. Next, at step 324, the resource manager consults the free block list to determine if a nominal number of blocks are available for use by the input client. In the preferred embodiment, each client is assigned a value corresponding to the number of nominal blocks to which it is entitled. In one example, assignment is based on the processing speed of the requesting client. That is, per each request, it may be desirable to provide fast processing clients with more blocks than slow processing clients. In one situation, the nominal number of blocks to be assigned a requesting client may not be available in the free block list. In this situation, the resource manager may provide the requesting client with one or more partial blocks until a whole block becomes available.

Figure 16:
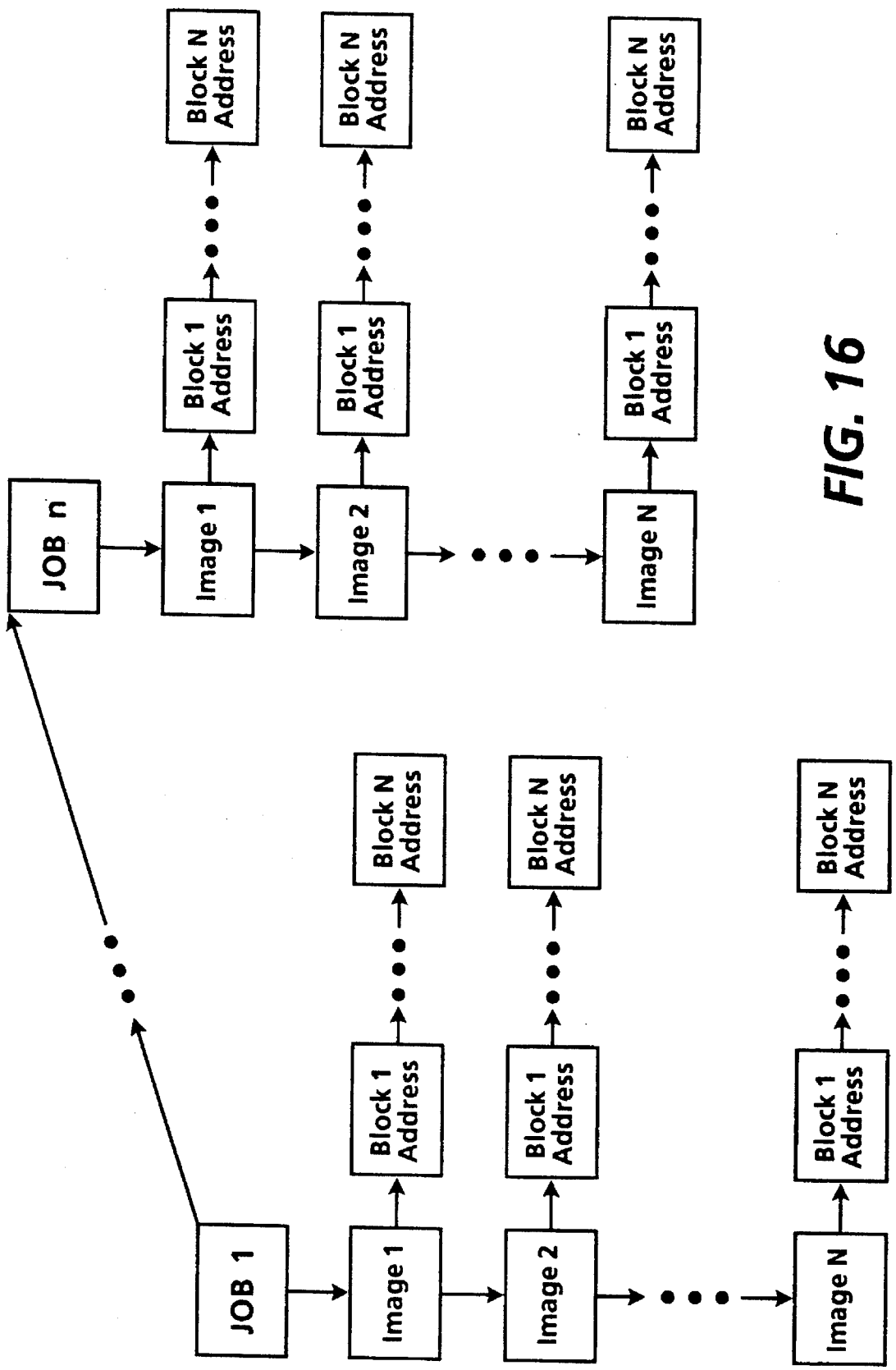
FIG. 16 is a schematic representation of a database format used in conjunction with the resource management scheme.

Assuming the nominal number of blocks is available, at step 326 the resource manager will place appropriate identifiers (i.e. information identifying both a first address and a size of each block) in the db 304. Referring to FIG. 16, a suitable database structure for use with the disclosed embodiment is shown. The database is constructed in a hierarchical scheme in which jobs are linked to images and images are linked to blocks. In one example, where the client's storable image data is associated with a first image (i.e. "Image 1") of a first job (i.e. "JOB 1"), then the first block identifier is placed at the location designated as "Block 1 Address". Subsequently, the client will access the database and, at step 328 (FIG. 10), locate the address of the first available block. The client will then, in cooperation with, for example, one of transfer modules 36, fill up the located block. When the scanner is serving as the client, the scanner will initiate a DMA transfer, with EPC memory 24, via the transfer module 36D (FIG. 2). Referring again to FIG. 14, the scanner is shown as using the EPC memory in conjunction with other clients. While the block 306A is shown as being a whole block, it will be understood that, in many instances, it would be a partial block.

Figure 17:
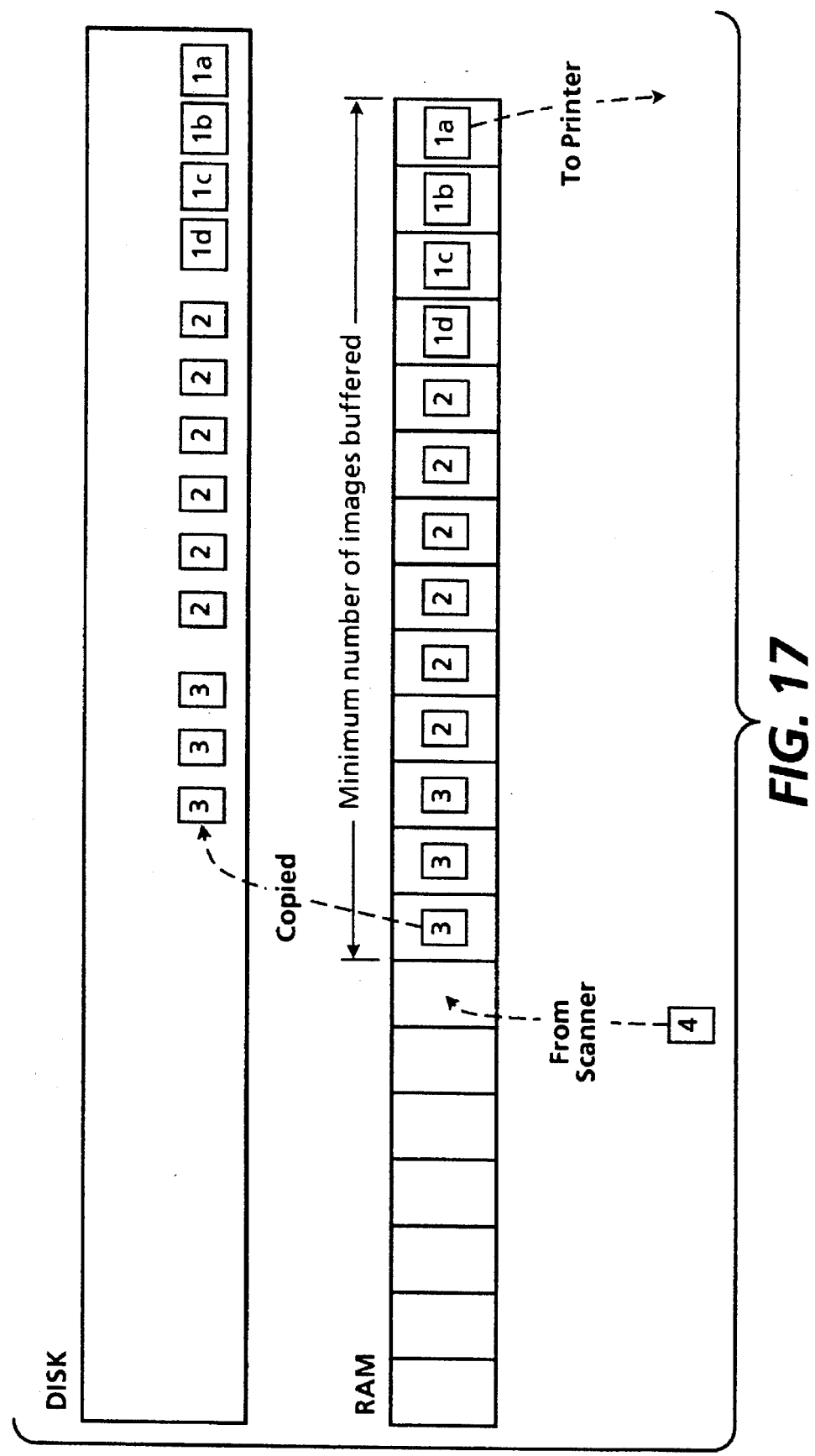
FIGS. 17–20 are schematic representations illustrating how a combination of electronic precollation (EPC) and disk memory is used in conjunction with the resource management scheme.

The printing system 10 offers the advantageous feature of storing jobs, intended to be outputted as multiple sets, on disk. In this way EPC memory can be made available to multiple clients in a relatively short time interval. Referring to step 332 of FIG. 11, when disk storage is desired, each stored block is copied to disk 34 (also see step 334 of FIG. 11). Referring to FIG. 17, a graphic representation demonstrating the relationship between EPC memory and disk is provided.

Figure 18:
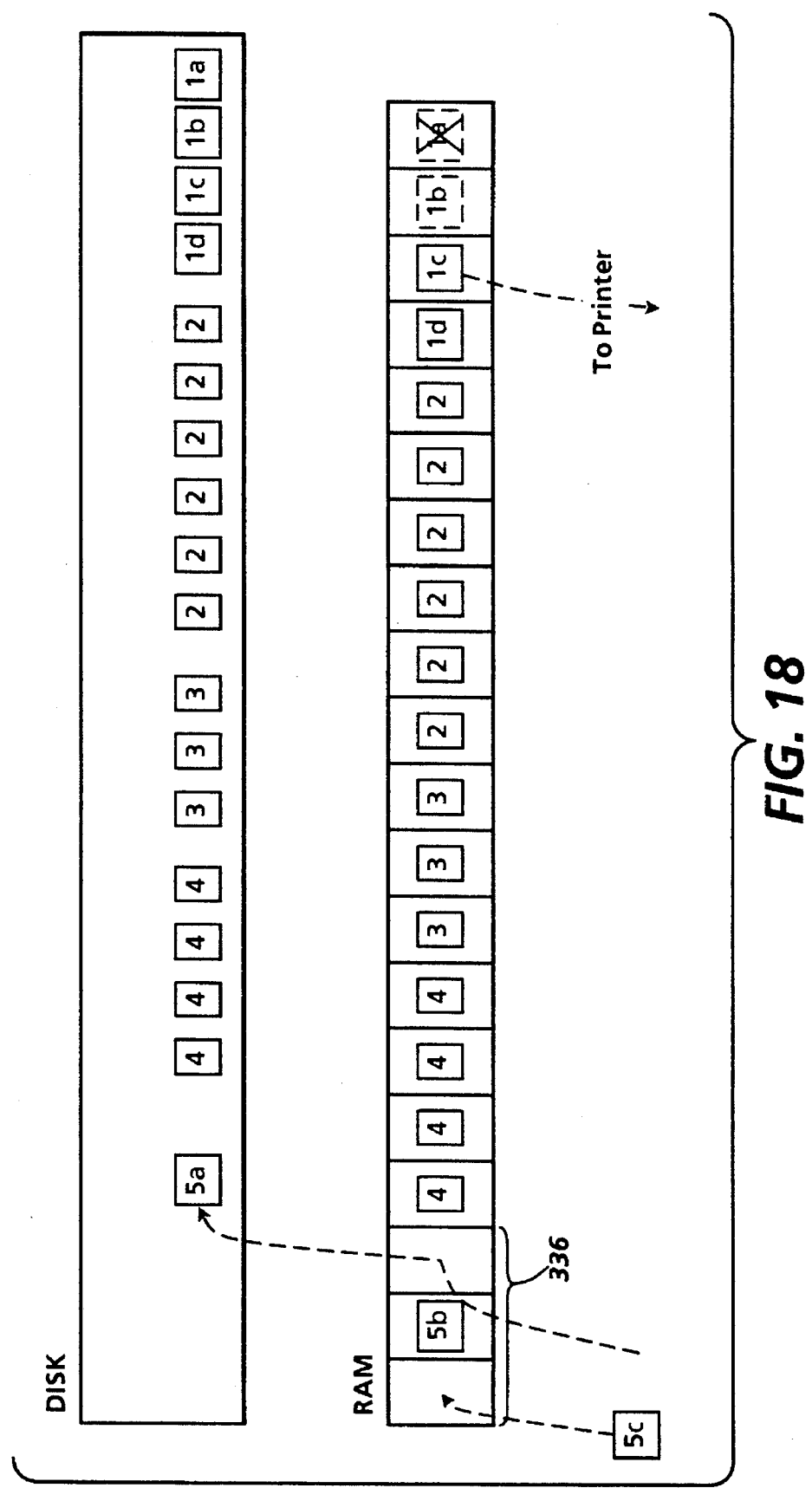

As further shown in FIG. 17, preferably, a minimum amount of input image pages, intended for printing, are buffered prior to printing. This has been found to be advantageous since a printer typically processes image data at a rate much greater than that of most input clients, such as the scanner. In the illustrated embodiment of FIG. 18, a variable buffer zone 336 is maintained for the scan client. This buffer zone is used to move image directly to disk, which enables the system to continue scanning without stopping. It will be appreciated that the variable zone can be used by clients, other than the scanner 18, to facilitate storage.

Referring again to FIG. 11, the input client transmits an interrupt signal to the controller, at step 338, when a block has been filled with image data. Alternatively, the input client could be provided, in advance, with pointers to lists of block addresses. In this way, the input client would read, without controller intervention, the locations of blocks to be used.

A determination is made at step 340 as to whether a full image has been written into EPC memory 24. Assuming that the end of the image has not been reached, it is determined, at step 342, whether another nominal number of blocks is required. It should be appreciated that, typically, when a client requires a nominal number of blocks, the resource manager provides it with a set of plural blocks. In application, those blocks follow a sequence and one of the blocks in the sequence is identified as a "relative last block" which, when reached, indicates that another set of blocks is required. The position of the relative last block is variable in that it need not, in absolute terms, be the last block of the set. If the relative last block has not been reached, then the process loops back to step 328 where the db 304 (FIG. 9) is accessed so that the client can locate the next block to be filled. On the other hand, if the relative last block has been reached, then the process loops back to step 324 for obtaining at least a part of another block set.

Figure 11:
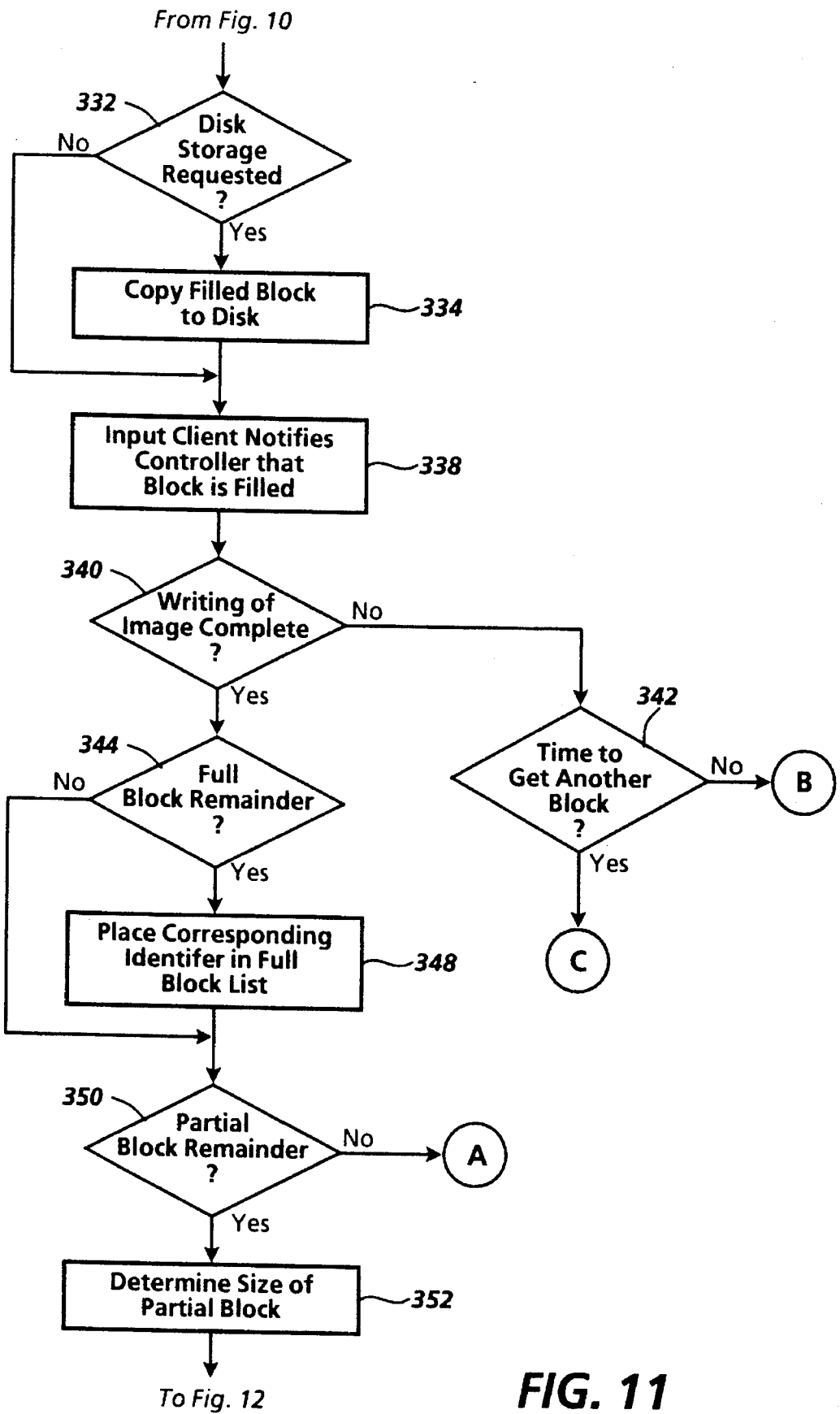
Figure 12:
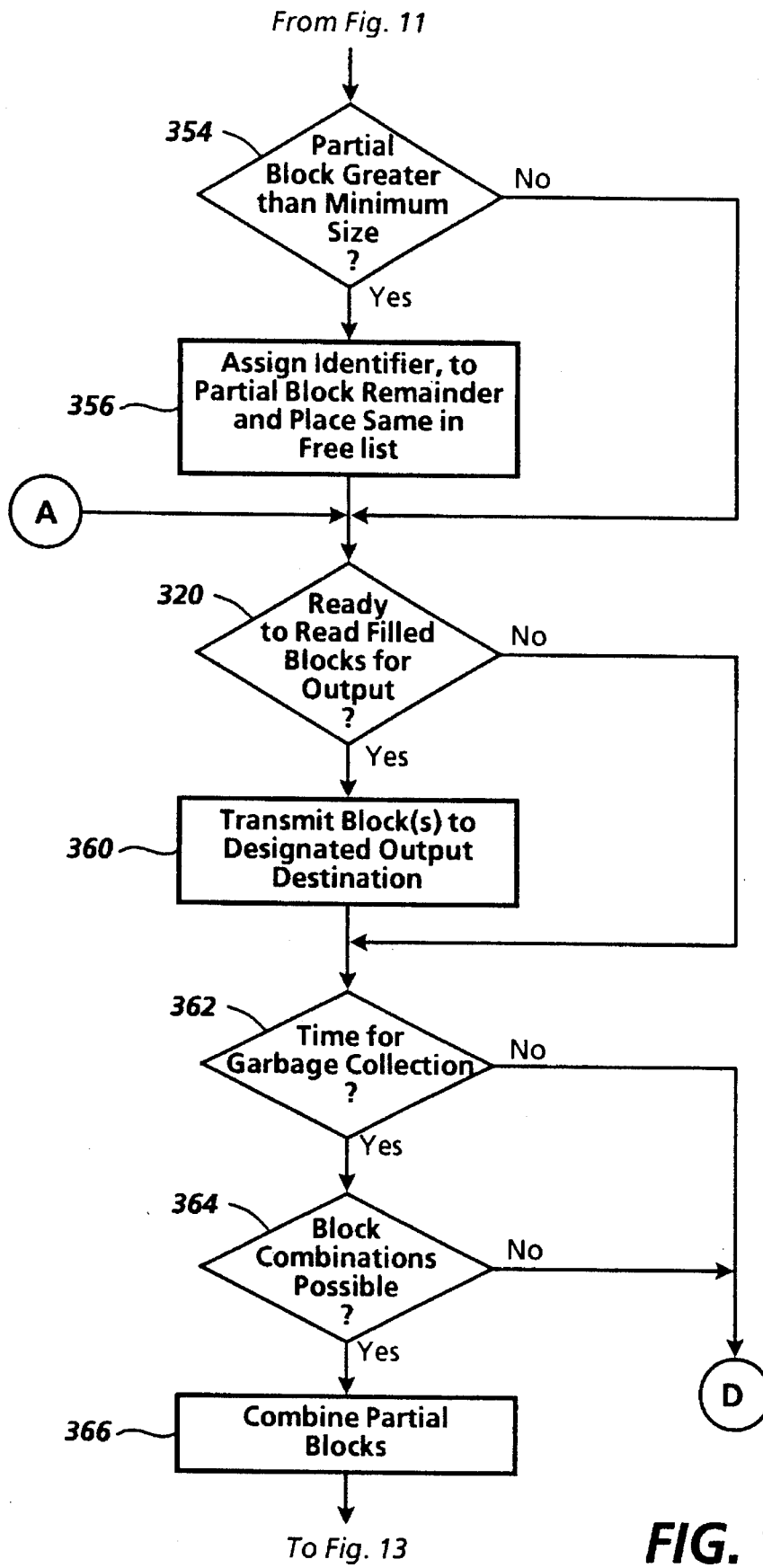
Figure 13:
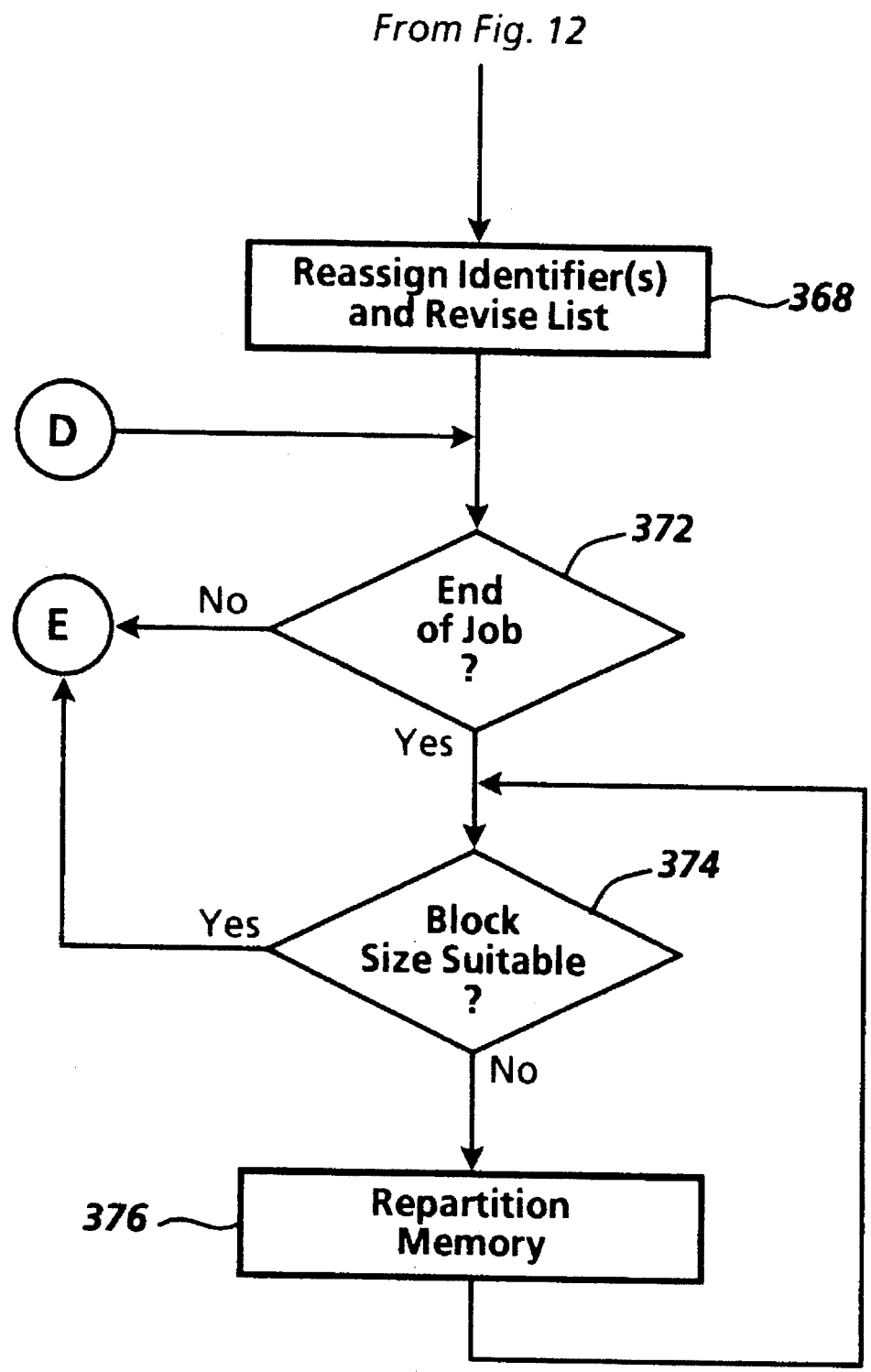

Referring still to FIG. 11, if it is determined, at step 340, that a full image has just been written into memory, then a series of steps is performed to prepare for the receiving of another image. First, the resource manager 300 (FIG. 9) determines, with step 344, if all of the full blocks have been used by the input client. If not, then the identifier of each surplus whole block is placed in the free block list (step 348), otherwise the process proceeds to step 350 where the resource manager determines if the image ends on a partial block. Referring again to FIG. 15, an example of how an image might end at a partial block is shown for the "Image 1". In the preferred embodiment, the size of the unused part of Image 1 is then determined in accordance with step 352 of FIG. 11. Referring to FIG. 12, if the size of the partial block is greater than a selected minimum size (step 354), then an identifier is assigned to the partial block (step 356) and placed in the free partial block list so that the partial block can be used to receive image data from another image, such as the "Next Image" of FIG. 15. For those cases in which a given partial block is smaller than a selected minimum, the given partial block is saved for "garbage collection", the significance of which will be described below.

At steps 320 and 360, the preferred methodology accommodates for the needs of an output client, such as a printer. Regarding step 360, the output client is preferably "told" where the image data, intended for use in outputting, resides. In this way, the output client can read the image data from the EPC memory. Additionally, as shown in FIG. 17, an output operation can be executed just before or after an input operation.

Figure 20:
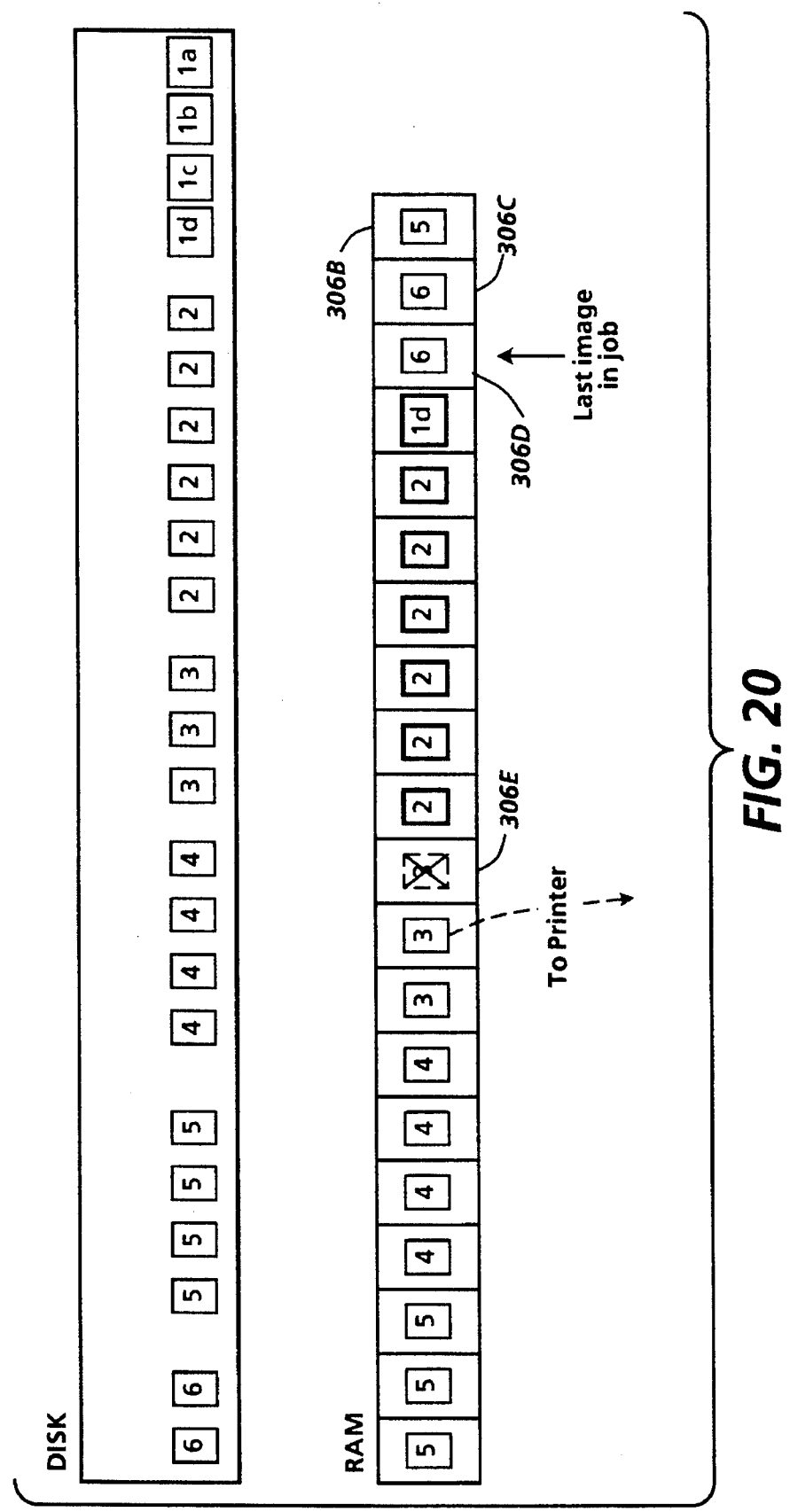

Referring to FIGS. 17, 19 and 20, an application of the the present memory management scheme, with respect to the printing client, is discussed in further detail. In the illustrated embodiments of FIGS. 17, 19 and 20, a given job, intended to be printed in multiple sets, is shown as including six images. In FIG. 17, the first three images are buffered and copied to disk. In FIG. 19, writing of images, to memory, continues concurrent with the reading of first and second image blocks by the printer. While the read/write operations are not "concurrent", in absolute terms, they appear, to a system operator, as being concurrent.

In FIG. 20, the end of the job is written into EPC memory at blocks 306B, 306C and 306D, while the beginning of the printing of a second set is initiated at block 306E. For the printing of the second set, the image 2, along with the block for 1D need not be copied from disk. As should be recognized, the EPC memory and disk function in a manner comparable to a ring buffering arrangement in that image data from disk can be written over image data in the EPC memory, continually, in order to form a desired number of sets.

At step 362 (FIG. 12), it is determined whether an appropriate time has arrived for "garbage collection". In the present context, garbage collection refers to combining "spent blocks", i.e. blocks having image data already "consumed" by an output client, for future use. In one example, a check for garbage collection is performed after a predesignated number of images have been printed. More particularly, garbage collection is performed as a background task, i.e. during a noncritical time of a job cycle.

To implement garbage collection, the possibility of block combination is checked at step 364 and partial blocks are combined, if possible, at step 366. It follows that block combination constitutes, in one example, linking partial blocks with references. As blocks are formed from partial blocks (step 368), some partial block identifiers will be discarded and the resulting whole block will be placed in the free block list. If garbage collection is not performable, the process proceeds to step 372.

At step 372, a check is performed to determine if the currently completed image is the last image in the job. If the image is not the last image, then the process loops back to step 316 where the input/output client accesses the db 304 for another block identifier, assuming that the client is ready. If, on the other hand, the job is complete, then a determination is made, at step 374, as to whether repartitioning is required. Repartitioning is performed (step 376) until a suitable block size is obtained. Subsequent to repartitioning the process loops back to step 316.

Numerous features of the above-disclosed embodiment will be appreciated by those skilled in the art:

First, the disclosed resource management scheme functions with a minimum amount of processing overhead. In particular, per a request by a client, block identifiers are placed at selected locations in a database. In turn, a selected client can access the database, determine where available blocks exist in memory, by reference to the block identifiers, and begin filling those blocks. As the client fills the blocks, it signals a controller and, in response to the signals, the controller indicates to a resource manager when to place more block identifiers in the database for the selected client. The process of providing blocks is transparent to the selected client and the resource manager is not required to possesses any significant knowledge about memory allocations of system clients in order to service the selected client appropriately.

Second, memory utilization of the system is enhanced in that memory blocks are employed in a particularly efficient manner. That is, unused blocks, whether they be partial or whole blocks, are placed in one or more free lists as soon as a given client ceases to have an immediate need for them. In turn, unused free blocks are allocated to other clients, in an expeditious manner and partial blocks are, in many instances, used to store the beginning and end parts of an image. In this way memory fragmentation is minimized and memory space is made available to clients, who have an urgent demand for it, as soon as possible.

Third, the resource management technique is flexible in that a wide variety of system parameters, such as nominal block size, number of blocks allocated to a given client at one time, and block allocation timing are variable. In this way, the attendant printing system can accommodate for varying input/output demands. Preferably, the system can keep track of compression ratios and adjust the variables to maximize performance for a particular location's majority usage. For example, if a location generally copies complex documents, which results in poorly compressed (large) images, the block size can be increased. Use of increased block size will result in fewer interrupts to the controller. Moreover, the system can, among other things, adjust block allocation according to individual client processing capability and predict the moment at which blocks, for a given client, should be made available.

Finally, the resource management scheme can be used to coincidentally manage volatile and nonvolatile memory in a manner that maximizes the functionality of the volatile memory, which volatile memory may be limited in space. Through efficient management of volatile and nonvolatile memory, even a job, having a size greater than that of the volatile memory (e.g. EPC memory) can be outputted in multiple sets with relatively little degradation in output rate. Moreover, volatile and nonvolatile memory can be used, conjunctively, to insure that even complex documents, having much greater size than that of the volatile memory, can be stored by a given input client without impairing operation of that given input client.

What is claimed is:

1. A method of managing memory allocation among a plurality of clients in a printing system with a controller and memory, the memory including a plurality of blocks with each of the plurality of blocks corresponding with an identifier indicating a location of one of the plurality of blocks in the memory, the controller having a resource manager for managing use of the memory and each client seeking to store one or more images, in the form of image data, in the memory, comprising:

in response to a request from one of the plurality of clients to store an image data set in memory, placing a first set of the identifiers, corresponding with a first set of the plurality of blocks, in a database;

accessing the first set of identifiers in the database with the one of the plurality of clients;

filling up one or more of the first set of blocks, with image data from the image data set, by referring to the first set of identifiers;

transmitting an interrupt signal to the controller, from the one of the plurality of clients when a designated one of the first set of blocks is filled; and in response to receiving the interrupt signal at the controller, placing a second set of identifiers, corresponding with a second set of the blocks, in the database, so that when the one of the plurality of clients has filled up a substantial portion of the first set of blocks, the one of the plurality of clients accesses the second set of blocks, by reference to the second set of identifiers for filling up one or more blocks of the second set of blocks wherein memory allocation is accomplished with a minimum amount of controller processing overhead.

2. The method of claim 1, wherein said filling step includes filling the first set of blocks with image data generated from a scan service, the scan service including a scanning apparatus for converting information disposed on a document, to the image data.

3. The method of claim 1, wherein the first set of blocks includes a last block with said step of placing second set of identifiers including placing the second set of identifiers into the database after the last block has been filled with image data.

4. The method of claim 1, further comprising the step of outputting a corresponding job, including one or both of the first and second block sets, with an output client.

5. The method of claim 4, further comprising the step of delaying the printing of the corresponding job until a pre-selected number of blocks are filled.

6. The method of claim 1, in which all of a filled block is used to print part of a corresponding job, further comprising the step of placing an identifier, associated with the used, filled block, in a first list.

7. The method of claim 6, further comprising the step of placing the identifier, associated with the used filled block, in the database, so that the identifier, associated with the used, filled block, is accessible by a second one of the plurality of clients.

8. The method of claim 6, in which only part of a block is used to print the corresponding job, further comprising the step of placing an identifier, associated with the used, partial block, in a second list.

9. The method of claim 8, further comprising the step of placing the identifier, associated with the used, partial block, in the database, so that the identifier, associated with the used, partial block, is accessible by a second one of the plurality of clients.

10. The method of claim 1, wherein the memory includes volatile and non-volatile memory sections with said filling step including writing image data into the volatile memory and copying the written image data into the non-volatile memory section.

11. The method of claim 10 in which one of the plurality of clients includes an output client and the output client reads image data of filled blocks in the volatile memory section, further comprising the step of prohibiting the output client from from reading image data from a selected number of blocks in the volatile memory section so that memory space is always available for the selected input client.

12. The method of claim 1, further comprising the step of partitioning a portion of the memory to provide the first and second sets of blocks.

13. The method of claim 1, in which the second set of blocks includes an end of image block with a first part and a second part, further comprising:

filling up the first part of the end of image block with image data corresponding with an end of a first image; and filling up the second part of the end of image block with image data corresponding with a portion of a second image.

14. The method of claim 13, further comprising the steps of:

designating the second part of the end of image block with an identifier;

placing the identifier in a partial block list, said second part filling up step including accessing the partial block list, with the one of the plurality of clients, to determine a space, in memory, to which the image data of the second image is to be transmitted.

15. The method of claim 14, in which the partial block list includes a block part other than the second part, further comprising the step of combining the block part with the second part to avoid memory fragmentation.

16. The method of claim 13, in which the one of the plurality of clients possesses a processing capability and the first set of blocks includes a selected number of blocks, further comprising the step of adjusting the selected number of blocks as a function of the input client processing capability of the one of the plurality of clients.

17. The method of claim 12 further comprising the step of repartitioning the memory, after a selected number of blocks have been filled, for changing block size in accordance with varying image size of individual images being stored in memory.

* * * * *